US009303787B2

(12) United States Patent
Eberle et al.

(10) Patent No.: US 9,303,787 B2
(45) Date of Patent: Apr. 5, 2016

(54) THERMOSTATIC SLIDE VALVE FOR A MOTOR VECHICLE

(71) Applicant: Dr. Ing. h.c. F. Porsche Aktiengesellschaft, Stuttgart (DE)

(72) Inventors: Wolfgang Eberle, Moensheim (DE); Thomas Lenz, Stuttgart (DE)

(73) Assignee: Dr. Ing.h.c. F. Porsche Aktiengesellschaft, Stuttgart (DE)

( * ) Notice: Subject to any disclaimer, the term of this patent is extended or adjusted under 35 U.S.C. 154(b) by 72 days.

(21) Appl. No.: 13/955,290

(22) Filed: Jul. 31, 2013

(65) Prior Publication Data

US 2014/0034855 A1 Feb. 6, 2014

(30) Foreign Application Priority Data

Aug. 1, 2012 (DE) .......................... 10 2012 107 034
Jul. 25, 2013 (DE) .......................... 10 2013 107 950

(51) Int. Cl.
*G05D 23/02* (2006.01)
*F16K 47/00* (2006.01)
*F16K 1/34* (2006.01)

(52) U.S. Cl.
CPC . *F16K 47/00* (2013.01); *F16K 1/34* (2013.01); *G05D 23/022* (2013.01)

(58) Field of Classification Search
CPC ..... F16K 31/002; F16K 31/445; F16K 47/08; F01P 2007/146; F01P 7/16; G05D 23/022
USPC ........................................... 251/11, 118, 344
See application file for complete search history.

(56) References Cited

U.S. PATENT DOCUMENTS

| 4,036,250 | A | 7/1977 | Dashner |
| 5,203,372 | A | 4/1993 | Freiler |
| 7,490,581 | B2 * | 2/2009 | Fishman ...................... 123/41.1 |
| 2002/0074535 | A1 | 6/2002 | Fink |
| 2007/0290059 | A1 | 12/2007 | Fishman |

FOREIGN PATENT DOCUMENTS

| BE | 530 628 | 10/1957 |
| DE | 37 40 500 | 4/1989 |
| DE | 102010002221 | 10/2011 |

(Continued)

OTHER PUBLICATIONS

German Patent Application No. 10 2013 107 950.4—Search Report issued Mar. 24, 2014.

(Continued)

*Primary Examiner* — Matthew W Jellett
(74) *Attorney, Agent, or Firm* — Gerald E. Hespos; Michael J. Porco; Matthew T. Hespos

(57) ABSTRACT

A valve (1) has a housing base (2) and a valve seat (18) supported by the housing base (2). An annular slide (12) is displaceable linearly relative to the housing base (2) between first and second operating positions. A sealing edge (17) of the annular slide (12) bears in a sealing manner against the valve seat (18) when the annular slide (12) is in the first operating position. However, the annular slide (12) is raised from the valve seat (18) in the second operating position to enable flow through the annular slide (12). At least one flow deflecting element (27) is provided to deflect a fluid flowing between the sealing edge (17) and the valve seat (18).

7 Claims, 2 Drawing Sheets

(56) References Cited

FOREIGN PATENT DOCUMENTS

| | | |
|---|---|---|
| DE | 102011077901 | 12/2012 |
| EP | 1 111 215 | 6/2001 |
| GB | 685200 | 12/1952 |
| GB | 946275 | 1/1964 |
| JP | 2004 239 283 | 8/2004 |
| WO | 2005078273 | 8/2005 |

OTHER PUBLICATIONS

French Patent Application No. 1,357,535—Search Report issued Oct. 24, 2014.

* cited by examiner

THERMOSTATIC SLIDE VALVE FOR A MOTOR VECHICLE

CROSS REFERENCE TO RELATED APPLICATION

This application claims priority under 35 USC 119 to German Patent Appl. No. 10 2012 107 034.2 filed on Aug. 1, 2012 and German Patent Appl. No. 10 2013 107 950.4 filed on Jul. 25, 2013, the entire disclosure of which is incorporated herein by reference.

BACKGROUND

1. Field of the Invention

The invention relates to a valve, such as, a thermostatic valve for controlling fluid flows in a motor vehicle.

2. Description of the Related Art

Thermostatic valves with annular slides are known in the prior art. The slide has a sealing edge that seals against a valve seat when the valve is closed so that fluid cannot flow through the valve. The sealing edge of the slide is raised from the valve seat when the valve is open so that fluid flows between the valve seat and the sealing edge of the valve slide and from there through the valve.

The valve slide generally is not raised completely at the beginning of the opening operation due to tolerances and asymmetries. Rather, the valve slide tilts and is raised more on one side than the other. As a result, fluid flowing past the sealing edge is subject to pressure fluctuations that cause vibration excitations of the valve slide with a disadvantageous effect on the supply of fluid.

It is an object of the invention to provide a valve that exhibits reduced vibration excitation and nevertheless is constructed simply and cost-effectively.

SUMMARY OF THE INVENTION

The invention relates to a valve with a housing base and a valve seat that is supported by the housing base. An annular slide is displaceable parallel to a normal of the housing base between first and second operating positions of the valve. The annular slide has a sealing edge that is adjacent to the housing base and bears in a sealing manner against the valve seat when the annular slide is in the first operating position. However, the sealing edge is raised from the valve seat to enable flow through the valve when the annular slide is in the second operating position. At least one flow deflecting element is provided to deflect a fluid flowing through between the sealing edge and the valve seat.

The flow deflecting element preferably is attached to the housing base on the inflow side and/or on the outflow side of the slide. As a result, the flow deflecting element is integrated into a component that already is present thereby providing a simple production.

The flow deflecting element preferably is a groove, a concavely curved wall region, an angle or an arc on the housing or on the housing base.

The flow deflecting element preferably deflects the flow in such a manner that, after the deflection, the flow strikes against the annular slide in the region of the sealing edge and/or against the entering or exiting flow. The reaction on the sealing edge, the slide and/or on the flow constricts the entering flow and thereby dampens or reduces vibration.

The vibration damping effect occurs substantially only directly after opening the slide because only then is an upright fluid column present in the inlet region. At a later time, the pump sucks off the fluid in the system so rapidly that the inflowing fluid is sucked off virtually immediately and the vibration effect is not present and therefore vibration damping is not required.

The annular slide preferably is acted upon by an actuator for displacement between the first and the second operating positions. The actuator preferably is an expansion material element, thereby defining a thermostatic valve that is actuated by thermal changes.

The actuator preferably displaces the slide away from the sealing edge counter to the force of a force accumulator. However, the slide bears against the valve seat without being subjected to force by the actuator.

The housing base preferably has a cylindrically protruding flange, and the flow deflecting element is arranged in the region of a transition from the planar housing base to the cylindrically protruding flange.

The flange preferably functions to hold the actuator.

The invention is explained in more detail below on the basis of exemplary embodiments and with reference to the drawings.

DETAILED DESCRIPTION OF THE PREFERRED EMBODIMENTS

Figure 1:
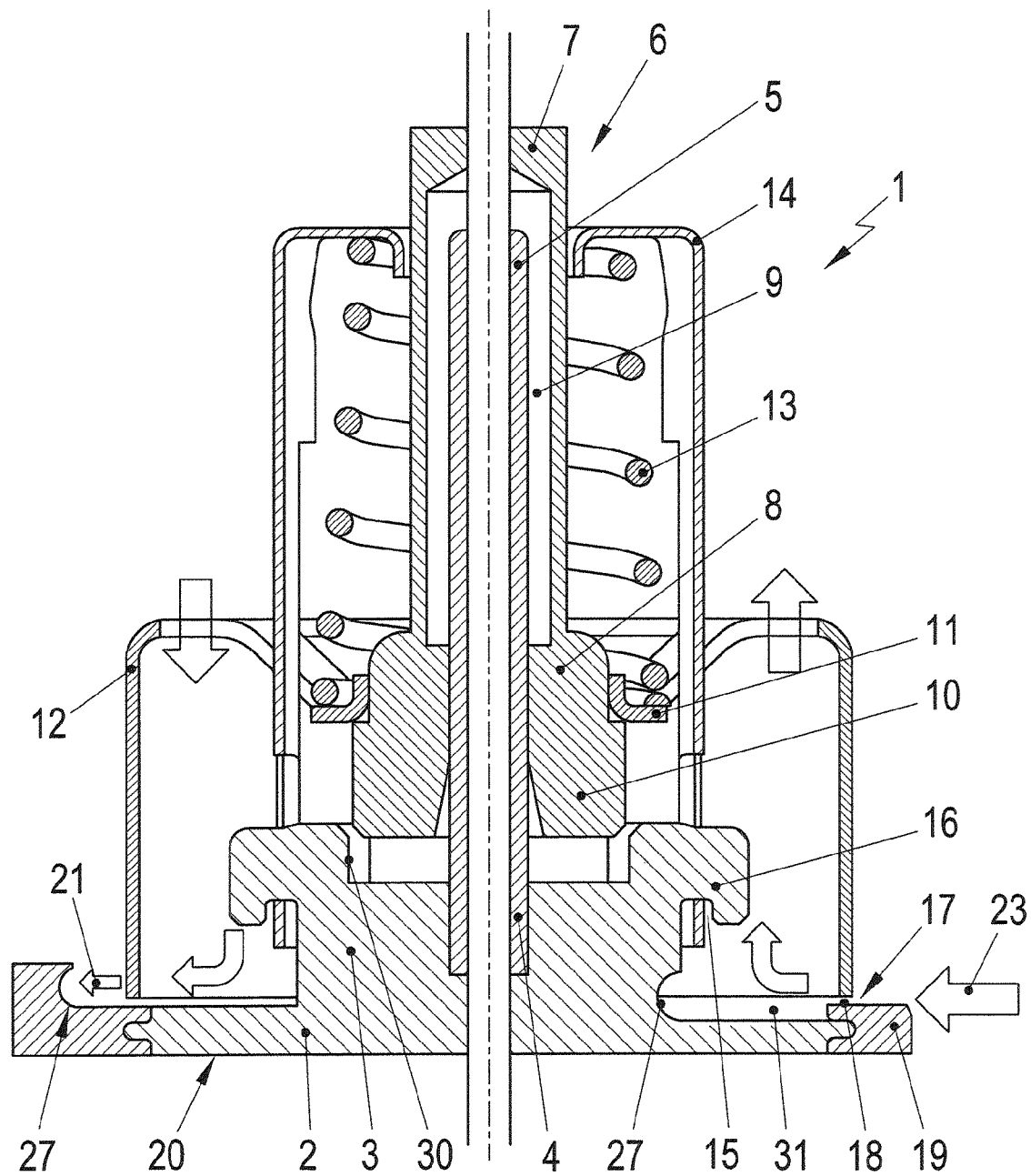
FIG. 1 shows a schematic view of a valve according to the invention.

FIG. 1 shows a valve 1 that has a housing base 2. The valve 1 is insertable, for example by means of the housing base 2, into an opening in a housing or into a fluid channel. Two embodiments of the valve 1 are illustrated in FIG. 1, with a first embodiment illustrated in the left half of FIG. 1 and a second embodiment illustrated in the right half of FIG. 1. The actual valve would have halves that are the same.

A cylindrical flange 3 protrudes in the axial direction at a central part of the housing base 2. The flange 3 is hollow and has a central bore 4 through which the piston 5 of the actuator unit 6 projects.

The actuator unit 6 preferably is designed as an expansion material element and has a piston 5, a housing 7, a seal 8 and an expansion material filling 9.

A guide 10 is provided between the actuator unit 6 and the flange 3 and is displaceable axially in a recess 30 of the flange 3. The guide 10 is integral with the sealing element of the seal 8 and is connected to the housing 7 in a form-fitting manner.

A retaining element 11 of an annular or cylindrical slide 12 is connected in a form-fitting manner radially on the guide 10 so that the annular slide 12 is displaced in the axial direction as the guide 10 is displaced in the axial direction.

The retaining element 11 is a disk or ring that protrudes radially in from the hollow-cylindrical region of the annular slide 12.

The region of the retaining element 11 of the annular slide 12 is clamped via a force accumulator 13 in relation to a cup-shaped element 14. The cup-shaped element 14 is suspended radially on the inside in the region 15 on hook-shaped elements 16 of the flange 3. Thus, axial displacement of the guide 10 relative to the fixed piston 5 and away from the flange or the base 2 is undertaken counter to the force of the force accumulator 13. The force accumulator preferably is a spiral or compression spring.

The annular or cylindrical slide 12 has an annular sealing edge 17 that comes to bear against a valve seat 18. The valve seat 18 is formed by a sealing element 19 provided in a receptacle 20 of the housing base 2. The sealing element 19 forms a flat plane onto which the sealing edge 17 of the annular slide 12 can be placed.

The annular slide 12 is raised from the valve seat 18 and enables flow through the valve 1 if the actuator 6 displaces the guide 10 up in FIG. 1 and away from the housing base 2.

The right half of FIG. 1 shows an inflow of a fluid 23 from radially on the outside through the opening between the annular slide 12 and the valve seat 18. The left half of FIG. 1 shows the fluid 21 flowing from radially on the inside, or from within the annular slide 12, radially out, or to the outside of the annular slide 12, so as to illustrate one possible flow passage.

Figure 2:
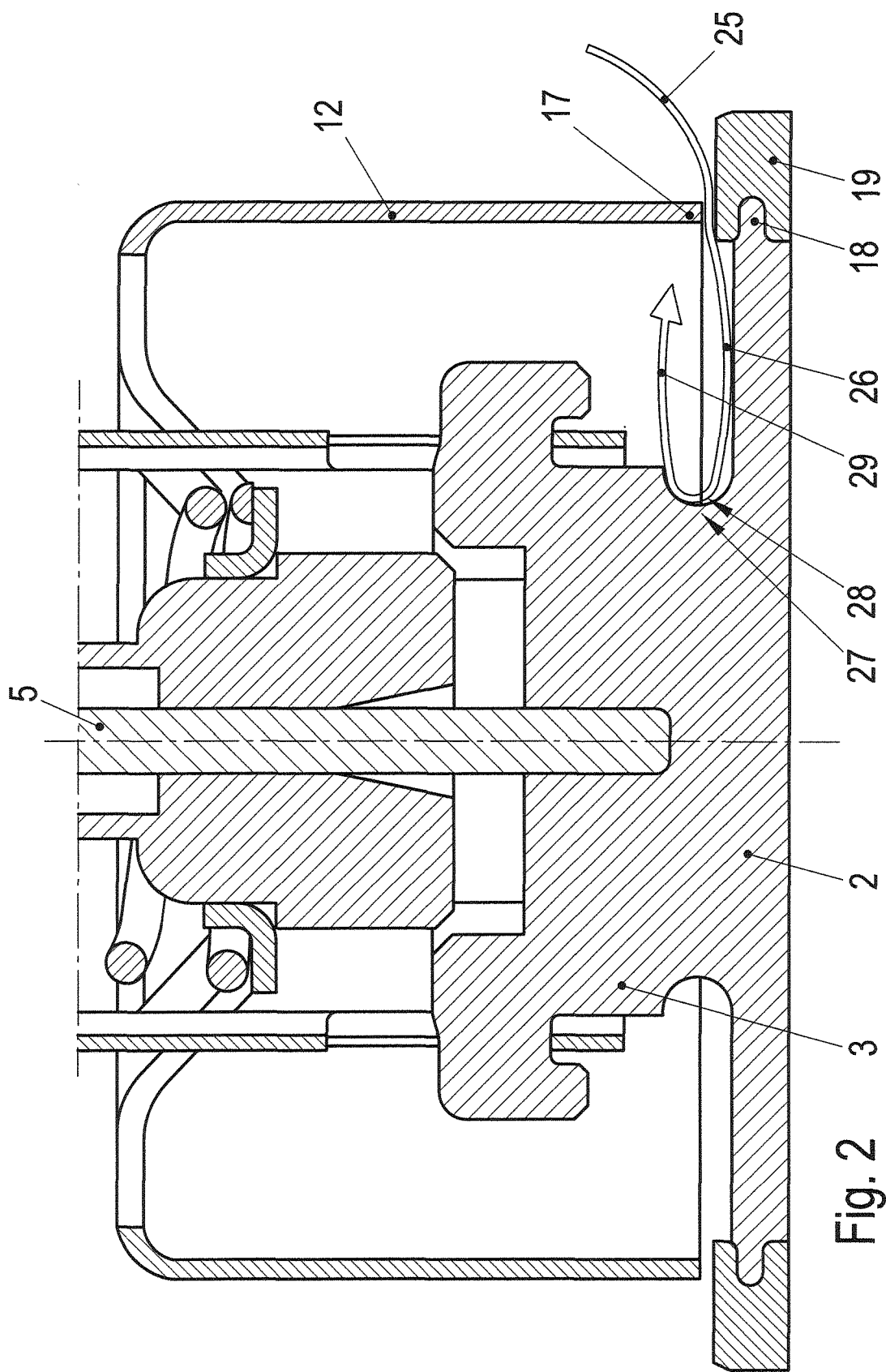
FIG. 2 shows a detail of the valve of FIG. 1.

FIG. 2 shows a detail of a housing base 2 with the sealing element 19 and with the piston 5 of the actuator 6. The sealing edge 17 of the annular slide 12 is raised from the valve seat 18 so that a fluid 25 can flow through the gap between the sealing edge 17 and the sealing element 19 of the valve seat. However, flow through a gap can take place only over part of the circumference if the slide opens asymmetrically.

The resultant fluid jet 26 or the flow enters the spatial region between the annular slide 12 and the flange 3 and causes the fluid flow to strike against a wall 28 of the flange 3 in the region of a flow deflecting element 27. The wall in this region preferably is angled in the transition from the base 2 to the flange 3. As an alternative or in addition, an additional clearance 31 behind the sealing edge also can favorably influence the flow.

This flow deflecting element 27 is configured as a groove or as a concavely curved region or as a radius or as an angle of the wall in such a manner that the fluid jet or flow 29 that arises strikes against the flow deflecting element 27 and is deflected toward the sealing edge 17 and/or against the inflowing fluid jet 26. Alternatively, the flow deflecting element 27 may be an additional part that is designed as a groove or as a concavely curved region or as a radius or as an angle of a wall of the additional part and that is formed annularly or polygonally. The flow deflecting element can be arranged within the annular slide 12 for deflecting the inflowing fluid flow. The flow deflecting element 27 can also be part of the wall of the housing base or else an additional part that has a curved region that is formed annularly. The flow deflecting element 27 can be arranged outside the annular slide 12 for deflecting the outflowing fluid flow.

This gives rise to a reaction of the fluid against the sealing edge or against the inflowing or outflowing fluid itself, the reaction reduces the previously produced parasitic vibrations.

What is claimed is:

1. A valve comprising:
   a housing base having a flange extending axially from the housing base, the flange having a cylindrical outer surface;
   a valve seat supported by the housing base in a position radially out from the cylindrical outer surface of the flange;
   an annular slide displaceable substantially axially relative to the housing base between a first operating position where a sealing edge of the annular slide is adjacent to the housing base and seals against the valve seat and a second operating position where the sealing edge is raised from the valve seat to define a gap between the sealing edge and the valve seat to enable flow through the annular slide in fluid flow direction; and
   at least one flow deflecting element defining a concave groove extending circumferentially around the outer cylindrical surface of the flange and at a position facing radially out toward the valve seat, the flow deflecting element being disposed and configured to deflect a fluid that has flowed between the sealing edge and the valve seat in an inflow direction so that the fluid is deflected back toward the valve seat.

2. The valve of claim 1, wherein the flow deflecting element is configured to deflect the flow in a fluid deflection direction substantially opposed to the fluid flow direction to strike against the annular slide upon initial opening, in a region of the sealing edge or against an entering or exiting flow.

3. The valve of claim 1, wherein the slide is displaceable by the actuator away from the sealing edge counter to a force of a force accumulator and, without being subjected to force by the actuator, bears against the valve seat.

4. The valve of claim 1, wherein the flow deflecting element is arranged in a region of a transition from the housing base to the flange.

5. The valve of claim 1, further comprising an actuator for raising the annular slide.

6. The valve of claim 5, wherein the actuator is an expansion material element.

7. The valve of claim 5, wherein the flange holds the actuator.

* * * * *